United States Patent
Ferri et al.

(10) Patent No.: US 7,475,158 B2
(45) Date of Patent: Jan. 6, 2009

(54) METHOD FOR ENABLING A WIRELESS SENSOR NETWORK BY MOTE COMMUNICATION

(75) Inventors: Richard Ferri, Ulster Park, NY (US); Moon J. Kim, Wappingers Falls, NY (US); Eric T. C. Yee, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 10/856,684

(22) Filed: May 28, 2004

(65) Prior Publication Data

US 2005/0275532 A1    Dec. 15, 2005

(51) Int. Cl.
*G06F 15/173* (2006.01)

(52) U.S. Cl. .............. 709/238; 709/239; 702/104; 455/41.2

(58) Field of Classification Search ......... 709/238–239; 702/103–104; 455/41.2, 63.4
See application file for complete search history.

(56) References Cited

U.S. PATENT DOCUMENTS

| | | | |
|---|---|---|---|
| 3,828,306 A | 8/1974 | Angeloni | |
| 5,389,935 A | 2/1995 | Drouault et al. | |
| 5,504,717 A | 4/1996 | Sharkey et al. | |
| 6,155,292 A | 12/2000 | Kurata | |
| 6,169,476 B1 | 1/2001 | Flanagan | |
| 6,293,861 B1 | 9/2001 | Berry | |
| 6,684,137 B2 | 1/2004 | Takagi et al. | |
| 6,795,786 B2 * | 9/2004 | LaMarca et al. | ............ 702/104 |
| 6,937,602 B2 * | 8/2005 | Whitehill et al. | ........ 370/395.54 |
| 7,200,132 B2 * | 4/2007 | Twitchell, Jr. | .............. 455/41.2 |
| 7,317,898 B2 * | 1/2008 | Tegreene | .................. 455/63.4 |
| 2003/0137415 A1 | 7/2003 | Thomson | |
| 2003/0222777 A1 | 12/2003 | Sweatt | |
| 2003/0234730 A1 | 12/2003 | Arms et al. | |
| 2004/0021582 A1 | 2/2004 | Ohdachi et al. | |
| 2004/0030507 A1 | 2/2004 | Jung | |

FOREIGN PATENT DOCUMENTS

EP     0942274 A2     9/1999
FR     2721129 A1    12/1995

\* cited by examiner

*Primary Examiner*—Bharat N Barot
(74) *Attorney, Agent, or Firm*—Hoffman Warnick LLC; Douglas A. Lashmit

(57) ABSTRACT

A system and method for implementing a wireless sensor network. The system comprises a plurality of motes, each mote having a sensor and a wireless communication system for communicating with neighboring motes; a distributed routing table distributed amongst each of the plurality of motes; and an update system for periodically updating the distributed routing table.

5 Claims, 3 Drawing Sheets

US 7,475,158 B2

METHOD FOR ENABLING A WIRELESS SENSOR NETWORK BY MOTE COMMUNICATION

BACKGROUND OF THE INVENTION

1. Technical Field

The present invention relates generally to wireless sensor networks, and more specifically relates to a system for monitoring environmental changes that utilizes a peer-to-peer network architecture for communicating information.

2. Related Art

Today, there exist numerous environmental-based public safety hazards, such as brush fires, bio-chemical accidents or attacks, etc. Obtaining real-time and accurate information about such a hazard can be critical to containing the hazard and minimizing damage.

Two broad challenges for dealing with such hazards include: (1) obtaining timely information at the site of the hazard; and (2) reliably communicating the information to a monitoring station. Current solutions for obtaining information such as satellite imaging or thermal sensors are not ideal for widespread use due to their high-cost and low-effectiveness. Often, data produced by current sensor solutions is unpredictable and is generated post incident. Accordingly, such data cannot be relied upon to make timely decisions about how to deal with the hazard.

Communicating the information collected by sensors can also be unpredictable since communication channels used to transmit the data may be affected by the hazard. In other words, if a critical communication node fails within a sensor network, critical information cannot be analyzed and acted upon in a timely fashion.

Numerous examples of sensor based detection systems currently exist. For instance, U.S. Pat. No. 6,169,476 B1, "Early Warning System for Natural and Manmade Disasters," issued to Flanagan on Jan. 2, 2001, describes a system for generating early warning signals via a network. U.S. Pat. No. 6,293,861 B1, Automatic Response Building Defense System and Method, issued to Berry on Sep. 25, 2001 describes a system for sensing hazardous contaminants near a building and taking some automated action. Both of the above references are incorporated by reference. Unfortunately, none of the prior art describes a robust wireless sensing system that can both obtain sensed data and transmit it in a cost effective and reliable manner. Accordingly, a need exists for such a system.

SUMMARY OF THE INVENTION

The present invention addresses the above-mentioned problems, as well as others, by providing a wireless sensor network, which utilizes "smart dust" sensors or "motes" to detect changes in the environment and transmit data through a mesh or ad-hoc network broadcast. Each mote comprises a power source (e.g., solar cell), a network node (e.g., a remote transceiver), and miniature devices capable of measuring environmental changes such as spikes in temperatures and detection of dangerous chemical agents (i.e., a sensor). The transmission of critical data is done via a mesh or ad-hoc network providing communication without dependency on a single point. If a sensor is damaged or becomes unavailable, another functioning sensor can continue to transmit. Network resiliency is achieved by identifying available sensors through an ad hoc network virtualization map.

In a first aspect, the invention provides a wireless sensor network comprising: a plurality of motes, each mote having a sensor and a wireless communication system for communicating with neighboring motes; a distributed routing table distributed amongst each of the plurality of motes; and an update system for periodically updating the distributed routing table.

In a second aspect, the invention provides a method for enabling a wireless sensor network having a plurality of motes, each mote having a sensor and a wireless communication system for communicating with neighboring motes, comprising the steps of: broadcasting a join command from each mote and a gather command from an endpoint; joining motes that neighbor the endpoint with the endpoint in a network; broadcasting a gather signal from each mote that joined the endpoint to cause additional motes to join the network; broadcasting a gather signal from each additional mote that joined the network to cause further additional motes to join the network; and repeating the previous broadcasting step until no further motes are available to join the network.

In a third aspect, the invention provides a mote for use in a sensor network, comprising: a sensor for sensing environmental data; a communication system for communicating with neighboring motes; a join and gather system for establishing the mote in a network of motes; a routing table that ranks a set of paths from the mote back to an endpoint; and an update system for periodically updating the routing table.

In a fourth aspect, the invention provides a method for enabling a wireless network having a plurality of devices, each device having a wireless communication system for communicating with neighboring devices, comprising the steps of: broadcasting a join command from each device and a gather command from an endpoint; joining devices that neighbor the endpoint with the endpoint in a network; broadcasting a gather signal from each device that joined the endpoint to cause additional devices to join the network; and broadcasting a gather signal from each additional device that joined the network to cause further additional devices to join the network.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
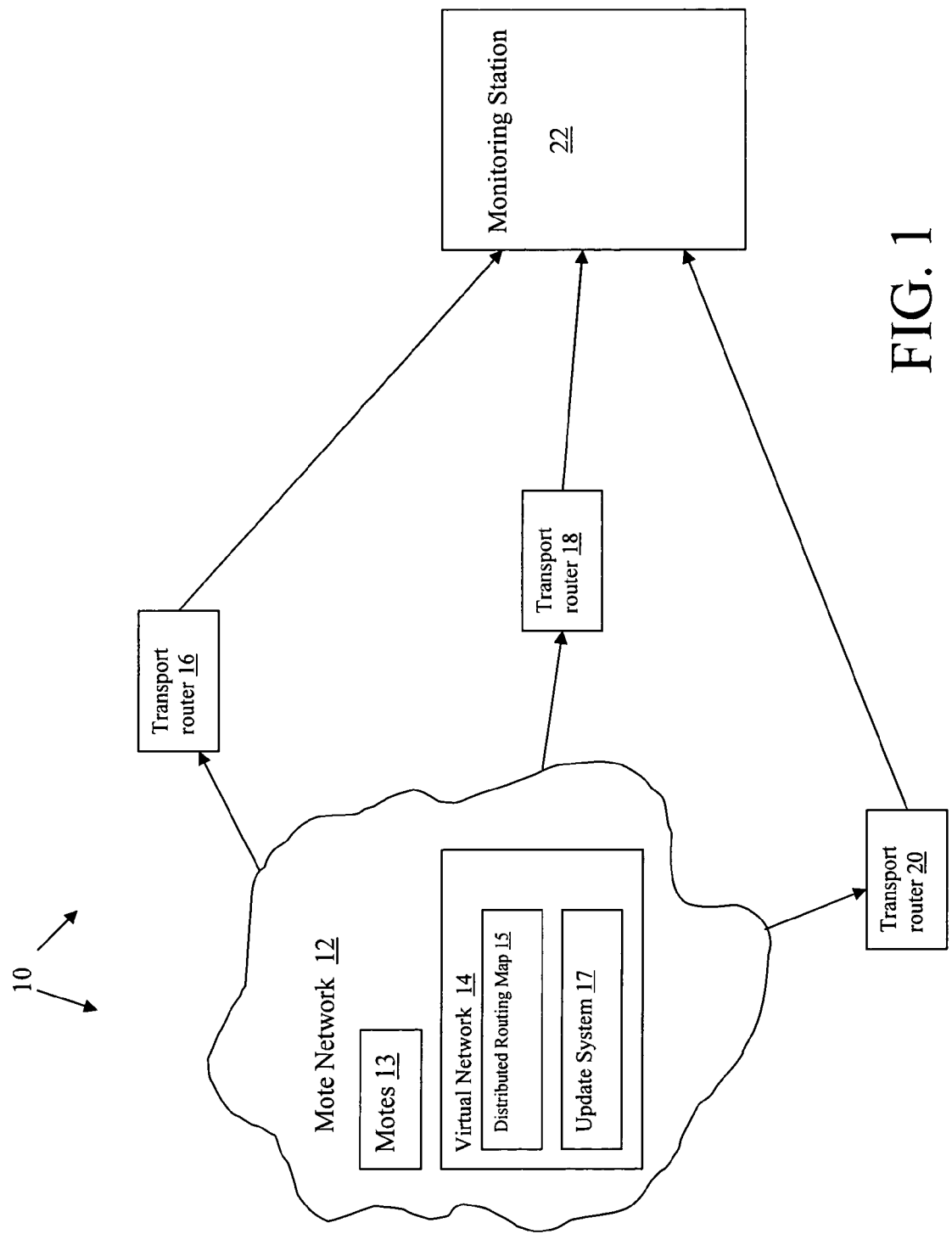
FIG. 1 depicts a wireless sensor network in accordance with the present invention.

Referring now to the drawings, FIG. 1 depicts a wireless sensor network 10 that includes a mote network 12, one or more transport routers 16, 18, 20, and one or more monitoring stations 22. Mote network 12 comprises: (1) a plurality of motes 13 for sensing environmental changes and communicating data, and (2) a virtual network 14 that provides a communication infrastructure for routing data amongst the plurality of motes 13 through a mesh or ad hoc network. As described in further detail below, each mote is a self-contained unit that is capable of communicating wirelessly to neighboring motes. Moreover, virtual network 14 includes a distributed routing map 15 that is distributed amongst the motes 13 and periodically updated with update system 17. Thus, if a mote loses the ability to relay data, the data can be re-routed using other available motes, thus providing network resiliency. In an illustrative embodiment, update system 17 utilizes a "pre-heartbeat" algorithm, described in further detail below, to update distributed routing map 15.

Transport routers 16, 18, 20 may comprise any type of router capable of relaying data between mote network 12 and monitoring station 22. Examples include high power cell towers, radio transmitters, microwave transmitters, etc. Monitoring station 22 may comprise any type of facility where sensed data from the mote network 22 can be analyzed, stored, displayed, etc.

Mote network 12 may be implemented in an ad hoc or mesh network that comprises either a full mesh or partial mesh topology. In a full mesh topology, each mote is in communication with each other. In a partial mesh topology, each mote is not necessarily in communication with the other motes. While the invention is described as being implemented in a wireless environment, it is recognized that some or all of the communications could be implemented using a wired technology.

Figure 2:
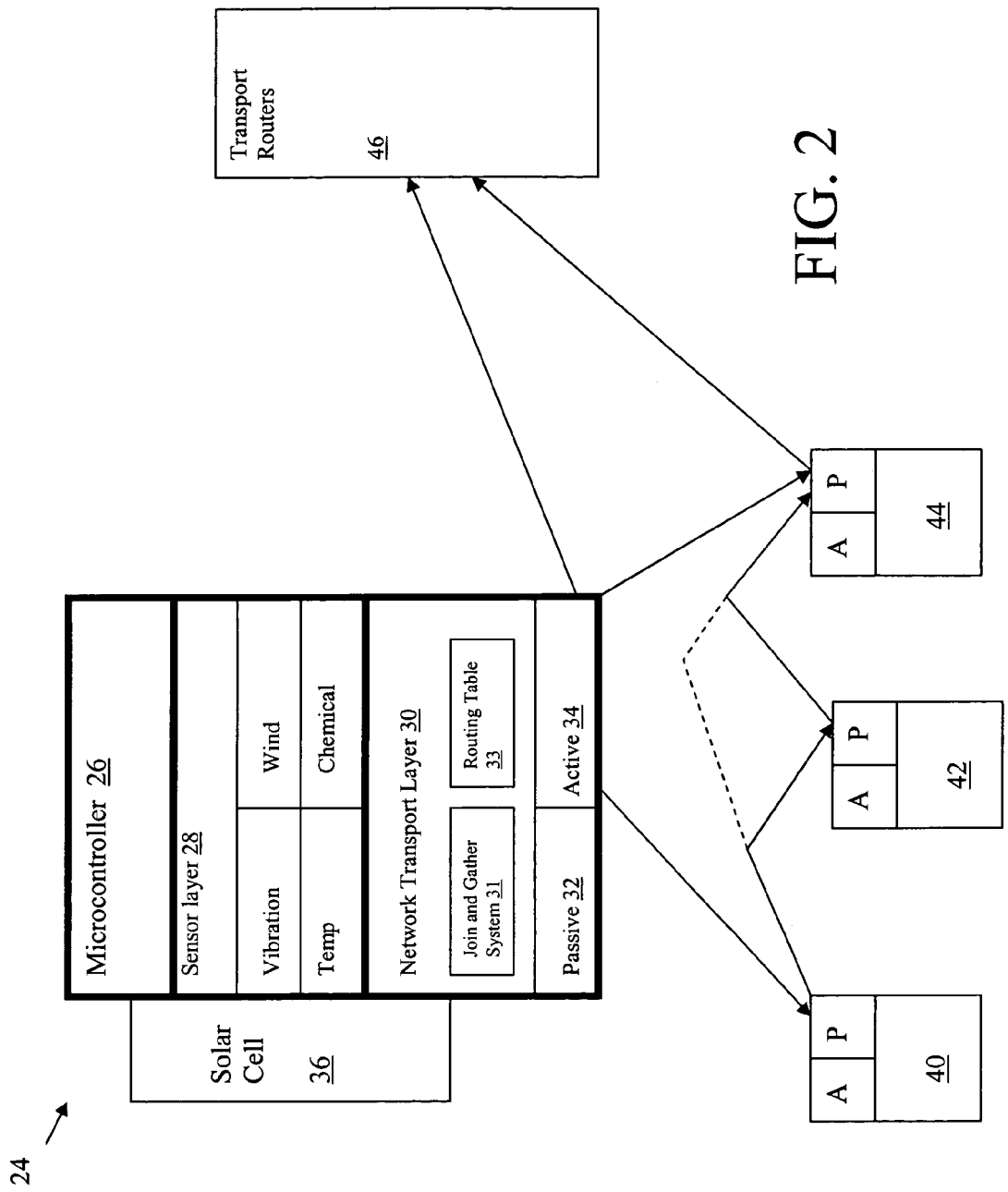
FIG. 2 depicts a plurality of motes in accordance with the present invention.

Referring now to FIG. 2, a plurality of motes 24, 40, 42, 44 are depicted, with mote 24 being shown in detail. In this illustrative example, mote 24 includes a microcontroller 26; a sensor layer 28 for sensing environmental changes in, e.g., vibration, wind, chemicals and temperature; a network transport layer 30 having a passive layer 32 and an active layer 34; and a energy supply, in this case solar cell 36.

The functions of microcontroller 26 may include: controlling the overall tasks to be performed by mote 24 (e.g., scheduling sensor readings and communications), controlling power to the various components, processing sensed data, determining the status of the mote 24, maintaining and updating the distributed routing map 15, etc. Sensor layer 28 may comprise any type of sensor or sensors that measure some environmental stimuli, including physical, chemical, or biological changes. Sensor layer 28 may collect, process and store sensed data. Network transport layer 30 may comprise any type of wireless communication system that allows mote 24 to communicate with neighboring motes 40, 42, 44, and/or transport routers 46.

As noted, each mote includes a passive layer 32 and an active layer 34. The passive layer 32 is used for passing or "hopping" data from one mote to another. Active layer 34 is utilized for communicating data gathered or generated by the mote itself. Thus, in this illustrative embodiment, data originating from mote 24 could potentially be passed directly to a transport router 46, be hopped through mote 44 to a transport router 46, or be hopped through motes 40, 42 and 44, before being passed to a transport router 46. In the event that mote 42 became unavailable, the data could for example be re-routed from mote 40 to mote 44 (via the dashed line).

As described in further detail below, each mote includes a join and gather system 31 for allowing the mote to be "joined" into the network by a neighbor, and allowing the mote to gather its neighbors into the network. Functional capabilities of the neighboring motes, including communication routing information, are maintained in a routing table 33.

Referring again to FIG. 1, to ensure that motes 13 within mote network 12 are able to relay the information gathered from their various attached sensors, they must rely heavily on communication paths through neighboring motes. These paths are determined based a distributed routing map 15 that is periodically updated by update system 17. The distributed routing map 15 is embodied in the routing tables stored with each of the motes 13. The routing tables are created using a "pre-active heartbeat" algorithm that ranks possible routing paths for each mote to relay data back to the main monitoring station.

As noted above, a "pre-active heartbeat" algorithm is utilized to update the routing table for each mote in the mote network 12. To accomplish this, the algorithm causes motes to gather their neighboring motes into the network 12, then have the neighboring motes gather their neighboring motes, etc., until all the motes have been gathered. The process begins at an Endpoint and expands outwardly across the mote network 12. Later, when sensor data is collected from the motes 13, the collected data is sent back to the Endpoints. An Endpoint may simply comprise a special type of mote that is for example capable of communicating to a transport router. Each mote is capable of communicating with one or more neighbors. It should be noted that while this process is described with reference to enabling a mote network 12, the methodology could be applied to enabling any type of network utilizing any type of communication device, e.g., cell phones, wireless routers, PDA's, etc.

When a mote is first powered up, its communication is limited to a JOIN broadcast message, which essentially says, "I'd like to join a network." Thus, when a mote network is first turned on, each mote can only broadcast a JOIN, and will not receive a response until an endpoint gets involved. Endpoints are initialized with the capability of responding to JOIN broadcasts. Namely, an Endpoint will answer all JOIN broadcasts that it can detect with a GATHER response. Thus, an Endpoint recognizes JOIN broadcasts from neighboring motes, and responds with a GATHER. As soon as a mote recognizes a GATHER, the mote becomes a member of the network and stops broadcasting the JOIN. Thus, initially, the mote network is comprised of the Endpoint and the Endpoint's neighboring motes. Neighboring motes may for example be defined as a set of motes that can communicate with each other.

As soon as a mote establishes itself in a network, the mote switches to a GATHER broadcast to gather its own neighbors. Thus, the cycle repeats itself, with each mote broadcasting a JOIN getting picked up as a neighbor of another nearby gathering mote (or endpoint). Again, whenever a mote becomes a neighbor within the network, it switches from JOIN to GATHER. Very quickly, all motes will become another mote's neighbor. As soon as a mote becomes a neighbor, it can collect data and send it to a neighbor. The neighbor will pass the data to its neighbor, etc., until the data makes its way back to the Endpoint. Network redundancy is established by allowing each mote to have many neighbors within the network in a manner described below.

After a short period, the entire mesh network is established. At some point, when a mote is no longer receiving JOIN requests, a mote can determine that the network is formed. Each mote will still send out GATHERs, but at a much lower frequency, since the only new motes that would join are motes that for example replace broken motes.

Figure 3:
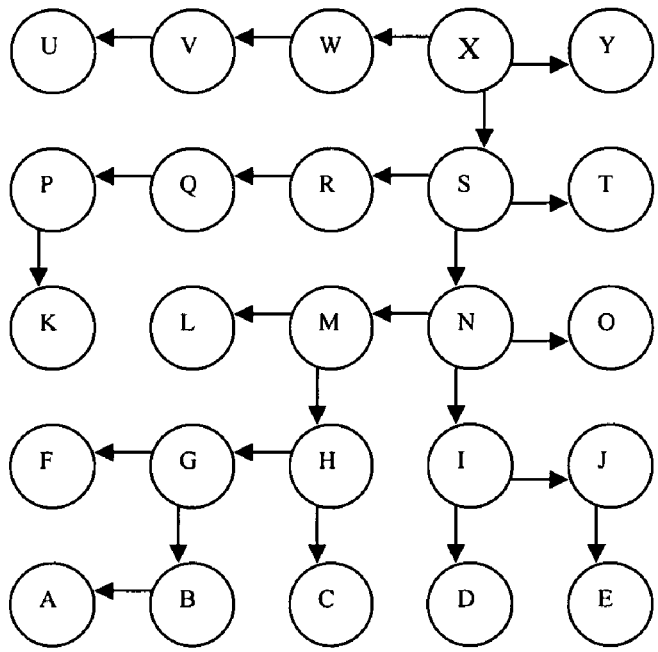
FIG. 3 depicts a diagram showing how a routing table is updated/created for a network of motes.

Referring now to FIG. 3, a mote network is shown in which each node represents a mote, and Node X represents an Endpoint. The "Pre-active Heartbeat" algorithm essentially has two phases, an initialization phase in which a mesh network is established and an update phase in which routes or paths to an endpoint are updated. In this illustrative example, the initialization phase starts from an Endpoint at Node X, which initiates the GATHER process to its neighbors (shown in FIG. 3 with arrows extending from Node X) to begin forming a network. In this case, Node X's neighbors are Nodes W, S and Y. Subsequently, Nodes W, S and Y switch to a gather mode to gather their neighbors. Thus, Node S gathers a second set of neighbors that includes Nodes N, R, and T. (Note that the algorithm does not limit the number of possible neighboring nodes and what is shown is just used as a reference to explain the algorithm.) This process will continue until no more JOIN/GATHER processes are possible within the network.

Figure 4:
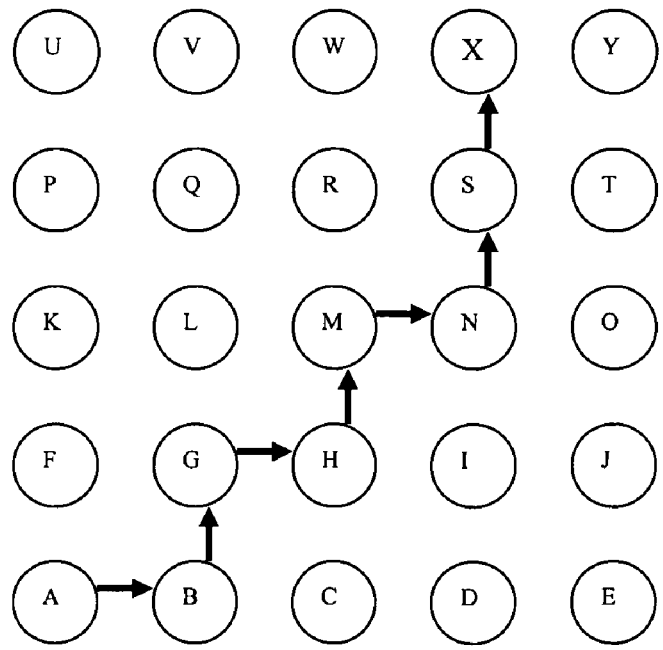
FIG. 4 depicts a diagram showing how data is passed back through the mote network of FIG. 2.

Each time a node is gathered, the gathered node stores the node and routing data of the node that gathered it, so that each node can establish a primary routing path back to the endpoint. Thus, as shown in FIG. 4, Node A would form a primary routing path A-B-G-H-M-N-S-X. While this may not be the most efficient route, it does not really matter at this point—once the network is established, further methods may be utilized to optimize the path back to the Endpoint. The important thing is that each mote knows a primary route back to the Endpoint—and that route is established through the mote that gathered him into the network.

As noted above, once a mote is gathered into a network, the gathered mote will remember a primary path back to the endpoint. However, because the primary path may not be the most efficient path, it is preferable to establish more efficient, secondary paths as part of the initialization phase. Secondary paths by definition provide additional paths back to the endpoint, e.g., in case of a failure of a mote somewhere in the primary path. To establish secondary paths, each mote will search for other neighboring motes it has in its range by, e.g., transmitting a simple ping, and maintain a list of all such motes within its range.

As part of the update phase, each mote will send test packets periodically to these other neighboring motes and record various communication criteria, e.g., how long it takes for the test packet to be received. Then, by having each mote share this data with its neighboring motes, the mote can determine and maintain a list of which motes provide the most efficient path to the Endpoint. Each path is stored by the mote in a routing table 31. Thus, when a path through mote x appears to be more efficient than a path through mote y, the mote will put mote x at the top of the list for communicating back to the endpoint. In this way, the mote will establish a primary path to the endpoint (through the mote that initially GATHERed it into the neighborhood) and a set of secondary paths through nearby motes. The mote will constantly evaluate which mote path is the quickest path back to the endpoint and choose the most efficient path.

Thus, the "Pre-active Heartbeat" algorithm ensures that each mote will have an optimized routing table that it uses to send data to its endpoint. Therefore, this will ensure that the communication path used is the most efficient and reliable. In addition, it provides backup routes and safely ensures that data sent to the endpoint will be complete.

As part of the update phase, each mote will check upon and evaluate its neighbors and rank its neighbors within the routing table. In one illustrative embodiment, the evaluation process predicts a link quality at the time of a future transmission to its neighbors. This may be accomplished by retrieving the following factors from each neighbor:
1. Statistically measuring neighbor links (L)
2. Estimating path loss (P)
3. Estimating data rate supported (D)
4. Estimating transmit power (TP)

After retrieving these values from its neighbors, a routing table is established to determined which mote will provide the best communication path. For example, values from neighbors of Node H in FIGS. 3 and 4 may be as follows:
Node M: L=75%, P=25%, D=100%, TP=100%
Node I: L=30%, P=75%, D=45%, TP=45%
Node C: L=80%, P=15%, D=100%, TP=100%
Node G: L=50%, P=30%, D=65%, TP=70%.

A Node S routing table base on the values obtained from its neighbors may look as follows:

| Neighboring Nodes | Priority ("1" being the first) |
|---|---|
| Node M | 1 |
| Node C | 2 |
| Node I | 3 |
| Node G | 4 |

The "Pre-active Heartbeat" algorithm may require the motes refresh their routing table at a predetermined frequency (e.g., every few milliseconds or microseconds depending on the requirements of the environment). This required "heartbeat check" may be related and dependent on the rate of the data sampling by the sensors. Each mote can prune its list of paths back to the endpoint if a nearby mote should fail—in other words if a nearby mote should fail, the motes that use the failed mote to path back to the endpoint should remove the failed mote from their list of available mote/paths.

In the case of a catastrophic failure (the death of many motes) it is possible that some data will not be able to make it back to the endpoint, however, this design has built in redundancy to minimize failed data transmission in case of catastrophic failure.

When the entire virtual routing path and connections are initialized and updated, each node in the environment will understand its quickest and most efficient path to relate data back to the Endpoint. Because of the way the system is initialized, each mote will store at least one path back to the Endpoint.

Referring again to FIG. 4, an illustrative path is shown for sending data from Node A to Node X. When Node A sends its sampled data packets to Node B, assuming that Node B provides the best connection path base on Node A's routing table, there must be a handshake established to certify that the data has been completely received. If a handshake has not been established, Node A will then have to refer back to its routing table to find the next best available communication path to send its data. Note that the routing table (depending on the refresh rate) may be the same such that Node A will then send it through another best node connection as a backup path. Note that the algorithm may have Node A retry to send its data packets to Node B for a certain number of attempts until it looks for another Node to send it to, base on the routing table it created.

Another feature of the "Pre-active Heartbeat" algorithm is that each mote can perform a self-analysis by checking various functionalities as follows:
1.) Power status (p)
2.) Radio status (r)
3.) Transmit status (Data Rate Supported) (tx)
4.) Memory status (Space) (m)
5.) Sensor(s) status (Operational or not) (s(1) . . . s(n) depending on the number "n" sensors attached to it)

For example, Node B may perform a self-analysis with the following results:

| Node B Functions | Status |
|---|---|
| Power Status | 50% |
| Radio Status | 75% |
| Transmit Status | 40% |

-continued

| Node B Functions | Status |
|---|---|
| Memory Status | 10% |
| Sensor Status | 100% |

Depending on the minimum requirements for all functionalities, Node B can be required to broadcast to its neighboring motes that it is in passive mode until some of its functions regain a predetermined status level, e.g., when its memory status is up to 50 percent and power status is up to 75 percent. When the predetermined status level is attained, Node B can turn active, and update its capabilities to neighbors.

Note that when a mote is in "Passive" mode, the mote may still be capable of relaying data (acting as a bridge) to another mote. A mote in Passive mode can act as a flag to caution other motes to try not to use it as a communication route, as oppose to when a mote is being in Active mode. Also, a mote in Passive mode due to sensor status and radio status of a mote can serve as an alert notification to the main monitoring station to either replace or repair the mote.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for enabling a wireless sensor network having a plurality of motes, each mote having a sensor and a wireless communication system for communicating with neighboring motes, comprising the steps of:
broadcasting a join command from each mote and a gather command from an endpoint;
joining motes that neighbor the endpoint with the endpoint in a network;
broadcasting a gather signal from each mote that joined the endpoint to cause additional motes to join the network;
broadcasting a gather signal from each additional mote that joined the network to cause further additional motes to join the network; and
repeating the previous broadcasting step until no further motes are available to join the network.

2. The method of claim 1, comprising the further step of storing within each mote a primary path back top the endpoint.

3. The method of claim 2, comprising the further step of having each mote identify a set of secondary paths back to the endpoint by attempting to communicate with other neighboring motes.

4. The method of claim 3, comprising the further step of having each mote rank the primary path and set of secondary paths in a routing table.

5. The method of claim 4, comprising the further step of having each mote periodically update its routing table by analyzing a set of communication criteria of the neighboring motes.

* * * * *